United States Patent
Larkin et al.

(10) Patent No.: US 7,275,474 B2
(45) Date of Patent: Oct. 2, 2007

(54) OPTICAL POSITION SENSING AND METHOD

(75) Inventors: Bruce D. Larkin, Plainwell, MI (US); Joseph A. Kovach, Aurora, OH (US); Matthew H. Simon, Kalamazoo, MI (US); Eric B. Chapman, Brea, CA (US); Dan T. Nguyen, Irvine, CA (US)

(73) Assignee: Parker-HannifinCorporation, Cleveland, OH (US)

( * ) Notice: Subject to any disclaimer, the term of this patent is extended or adjusted under 35 U.S.C. 154(b) by 0 days.

(21) Appl. No.: 11/440,636

(22) Filed: May 25, 2006

(65) Prior Publication Data

US 2006/0266211 A1    Nov. 30, 2006

Related U.S. Application Data

(60) Provisional application No. 60/686,084, filed on May 31, 2005.

(51) Int. Cl.
*F01B 31/12* (2006.01)
*F01B 3/00* (2006.01)

(52) U.S. Cl. .................. 92/5 R; 92/12.2; 91/1

(58) Field of Classification Search ............. 92/5 R, 92/12.2, 71; 91/1, 499, 505
See application file for complete search history.

(56) References Cited

U.S. PATENT DOCUMENTS

| | | | |
|---|---|---|---|
| 4,306,457 A * | 12/1981 | Fukui et al. | |
| 4,428,243 A * | 1/1984 | Taylor | |
| 4,489,384 A | 12/1984 | Hurley et al. | |
| 4,527,054 A | 7/1985 | White | |
| 4,655,689 A | 4/1987 | Westveer et al. | |
| 4,808,092 A | 2/1989 | Funke | |
| 4,848,871 A | 7/1989 | Seidel et al. | |
| 4,887,469 A | 12/1989 | Shoptaw | |
| 4,915,591 A | 4/1990 | Funke | |
| 4,925,371 A | 5/1990 | Griesmar | |
| 5,214,278 A | 5/1993 | Banda | |
| 5,261,275 A | 11/1993 | Davis | |
| 5,388,466 A | 2/1995 | Teunissen | |
| 5,531,680 A | 7/1996 | Dumas et al. | |
| 5,747,703 A | 5/1998 | Plisson et al. | |
| 5,895,847 A | 4/1999 | Steuer | |
| 6,123,686 A | 9/2000 | Olsen et al. | |
| 6,200,101 B1 | 3/2001 | North, Jr. | |
| 6,327,791 B1 * | 12/2001 | Norcross et al. ............. 33/706 |
| 6,375,247 B1 | 4/2002 | Volz et al. | |
| 6,540,485 B2 | 4/2003 | Nara et al. | |
| 6,623,247 B2 | 9/2003 | Du | |

(Continued)

*Primary Examiner*—Michael Leslie
(74) *Attorney, Agent, or Firm*—Daniel J Whitman; Joseph J. Pophal

(57) ABSTRACT

In a variable displacement type hydraulic pump/motor assembly including at least one internally movable component, such as a yoke, a swashplate, and the means for moving the swashplate, the improvement includes imparting on this component absolute location indicia markings and the addition of an optical/electronic sensor unit capable of reading such indicia markings fixedly located on a housing of the pump/motor assembly and including an optical read head extending into the housing interior and located at a spaced distance from the indicia markings for reading same, relative to a reference location, and producing a signal indicative of the absolute position of the movable component. The signal can then, in turn, be used for controlling the displacement of the pump/motor assembly. A method for determining the absolute component position is also set forth.

46 Claims, 9 Drawing Sheets

U.S. PATENT DOCUMENTS

| | | |
|---|---|---|
| 6,779,433 B2 * | 8/2004 | Brosch et al. ................ 92/5 R |
| 6,834,574 B2 * | 12/2004 | Neumann ........................ 91/1 |
| 7,178,446 B2 * | 2/2007 | Kucher et al. ................... 91/1 |
| 2004/0115065 A1 * | 6/2004 | Du et al. |

* cited by examiner

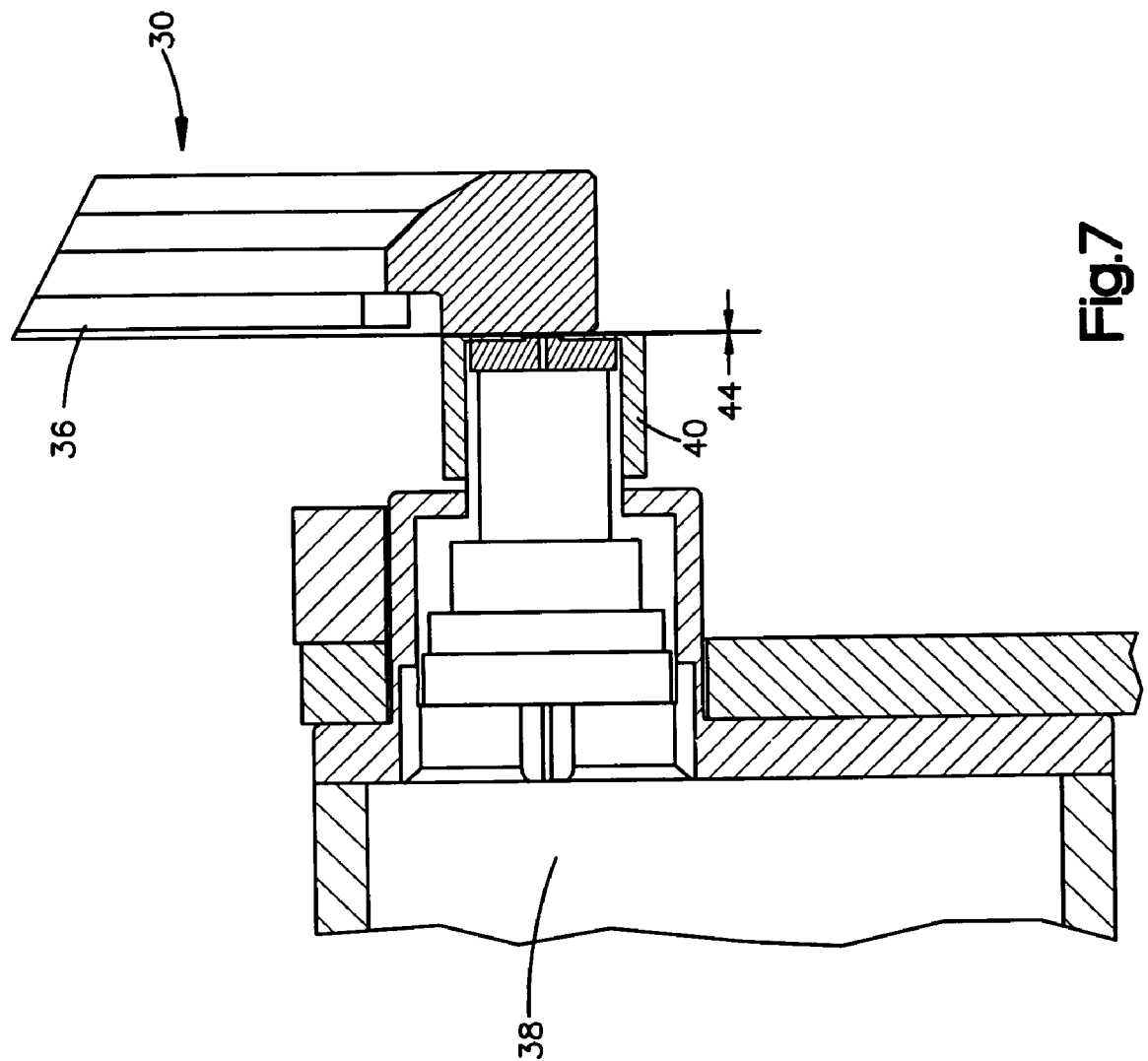

OPTICAL POSITION SENSING AND METHOD

CROSS-REFERENCE TO RELATED CASES

The present invention claims the benefit of the filing date of U.S. Provisional Patent Application Ser. No. 60/686,084, filed May 31, 2005, the disclosure of which is incorporated herein by reference.

FIELD OF THE INVENTION

The present invention pertains to a variable displacement type hydraulic pump/motor assembly having at least one internally movable component, such as a yoke or a swashplate, and means for moving the yoke/swashplate, wherein the improvement includes imparting thereon of absolute position location indicia markings, in the form of a bar-type pattern, and the addition of an optical/electronic sensor unit, including an optical read head, for reading such indicia markings and producing a signal indicative of the absolute position of this component, which can then be used for controlling the displacement of the pump/motor assembly.

BACKGROUND OF THE INVENTION

While the present invention provides direct and/or indirect rotary position feedback by means of an optical sensing device, the current art includes the use of rotary potentiometers, such as LVDTs (Linear Variable Differential Transformers), rotary Hall effect sensors and mechanical feedback devices. Often, contact methods are employed for position feedback and cause wear of mechanical parts. In addition, it is difficult to design a pump/motor wherein a sensor can be so positioned as to read the position of the yoke/swashplate. Also, there are frequent problems in replacing and recalibrating replacement sensors.

Some prior art sensors are affected negatively by temperature, especially high temperatures that, as the pump/motor housing or casing heats up, can either ruin the sensor or at least adversely affect its precision.

The patent literature includes a large number of devices, sensors and control systems that pertain to variable displacement pump/motor assemblies and include, but are not limited to: U.S. Pat. No. 4,527,054 to White; U.S. Pat. No. 4,655,689 to Westveer et al.; U.S. Pat. No. 4,915,591 to Funke; U.S. Pat. No. 4,925,371 to Griesmar; U.S. Pat. No. 5,214,278 to Banda; U.S. Pat. No. 6,375,433 B1 to Du et al.; U.S. Pat. No. 6,623,247 B2 to Du; and U.S. Published patent application Ser. No. 2004/0115065 A1 to Du et al. However, none of these prior art devices pertains to an improved optical position sensing or to method for sensing the absolute position of a movable internal component in a variable displacement type hydraulic pump/motor assembly as set forth in the present invention.

SUMMARY OF THE INVENTION

Accordingly, in order to overcome the deficiencies of the prior art devices, the present invention provides an improved optical position sensing device utilizing absolute location indicia markings, in the form of bar-type patterns, imparted on a movable internal component, such as a yoke, swashplate, or means for moving the swashplate of a variable displacement type of a hydraulic pump/motor assembly, wherein an optical sensor, fixedly located in the assembly housing and being located at a spaced gap from the indicia markings, is utilized for reading these indicia markings, relative to a fixed location, and produces an output signal indicative of the absolute position of the movable component, which signal can then be used for controlling the displacement of the pump/motor assembly.

Specifically, in terms of structure, one embodiment of the present invention pertains to an improved optical position sensor for a variable displacement type hydraulic pump/motor assembly including an angularly movable yoke or an angularly movable swashplate, an optical/electronic sensor unit capable of reading indicia markings, for sensing the movement of at least one of the yoke, the swashplate and means for moving the swashplate, relative to a reference location in a stationary housing of the pump/motor assembly, the one of the yoke, the swashplate and the means for moving the swashplate, being provided with a plurality of absolute scale indicia markings, wherein the improvement comprises: a. the absolute scale indicia markings being in the form of a bar-type pattern and being located in a surface of one of the angularly movable yoke, the swashplate and the means for moving the swashplate; and b. the optical/electronic sensor unit being fixedly located on the stationary housing and including an optical read head sealingly extending into the interior of the housing and being located at a predetermined, spaced distance from the indicia markings, for sensing the indicia markings and producing an optical signal.

One version thereof further includes means for converting the optical signal into an electrical signal indicative of the absolute position of the at least one of the yoke, the swashplate and the means for moving the swashplate. In a variation thereof, the electrical signal includes one of an analog voltage, proportional to the angular position of the at least one of the yoke and the swashplate, and a digital serial communication message containing the digital angle of at least one of the yoke and the swashplate. In another variation thereof, the electrical signal includes one of an analog voltage, proportional to the absolute longitudinal position of the means for moving the swashplate, and a digital serial communication containing the absolute longitudinal position of the means for moving the swashplate, the absolute longitudinal positions being indicative of the angular location of the swashplate.

In another version thereof, the means for moving the swashplate takes the form of a setting piston capable of longitudinal movement, the setting piston being operatively pivotally interconnected with the swashplate.

In a further version thereof, the distance is one of less than 1 mm. in width, less than 0.8 mm. in width and about 0.6 mm. in width. In a variation thereof, the distance is filled with a working fluid. In differing variations, the working fluid is translucent to light, with the light being visible light, while in another variation thereof, the visible light is strobed and confined to the red spectrum. In an additional variation, the light is IR light. In still another variation thereof, the working fluid is one of a liquid and a gas. In yet a differing version thereof, the liquid includes hydraulic fluid and the gas includes air, while in a variation thereof, there is an absence of a working fluid in the spaced distance.

In an added version, the absolute scale indicia markings are provided on one of a ring member and disc attached to the yoke, while in a variation thereof, the indicia markings are integral with the one of the ring member and disc.

In yet another version thereof, the absolute scale indicia markings are provided on 5 the swashplate, while in a variation thereof, the indicia markings are integral with the swashplate.

In still an additional version, the indicia markings include a progressive, differing, binary number pattern of dark and light stripes, the binary number pattern corresponding with specific angular positions of the absolute scale indicia pattern on the noted surface. In a first variation thereof, the progressive, differing, binary pattern of dark and light stripes is anodized on one of a ring member and disc attached to one of the swashplate and yoke, with the pattern of stripes being in the form of an arched, radially-directed, bar-type pattern having an angular extent corresponding to at least the angular movement of the swashplate and yoke. In a second variation thereof, the progressive, differing, binary pattern of dark and light stripes is integral with the swashplate, the pattern of stripes being in the form of an arched, radially-directed, bar-type pattern having an angular extent substantially corresponding to the angular movement of the swashplate. In a further variation, the progressive, differing, binary pattern of dark and light stripes in integral with the means for moving the swashplate. In yet a differing variation, the means for moving the swashplate takes the form of a setting piston capable of longitudinal movement and operatively pivotally interconnected with the swashplate, the progressive, differing, binary pattern of stripes being integral with an outer peripheral surface of the setting piston and being in the form of a laterally-directed, peripherally curved, bar-type pattern having a longitudinal extent substantially corresponding to the maximum longitudinal movement of the setting piston, with longitudinal locations thereof substantially corresponding with angular positions of the swashplate.

In a further version, the reference location substantially coincides with the location of the optical read head.

In a variation of an earlier version, the electrical signal is utilized for providing positional feed back to a hydraulic controller for closed-loop control of one of the yoke, the swashplate and the means for moving the swashplate. In a further variation of this earlier version, the electrical signal is utilized for providing positional feedback for open-loop instrumental purposes.

In a final version of this embodiment, the optical/electronic sensor unit includes a strobing LED lamp and is conducted, via fiber optic bundles, to the absolute scale indicia markings located in a surface of one of a ring member/disc attached to the yoke, the swashplate and the means for moving the swashplate. In a variation thereof, the spectrum of the light is red.

Another embodiment of the present invention pertains to a method for sensing the absolute position of an angularly movable swashplate/yoke in a variable displacement type hydraulic pump/motor assembly, the assembly including: the angularly movable swashplate/yoke; means for moving the swashplate/yoke; an optical electronic sensor unit, capable of reading indicia markings, for sensing the movement of at least one of the swashplate/yoke and the means for moving the swashplate/yoke, relative to a reference location in a stationary housing containing the pump/motor assembly, the method including the steps of: a. providing one of the swashplate/yoke and the means for moving the swashplate/yoke with absolute indicia markings; b. forming the indicia markings in a bar-type pattern and locating same in a surface of one of the swashplate/yoke and the means for moving the swashplate; c. fixedly locating the optical/electronic sensor on the stationary housing; d. extending an optical read head, associated with the optical/electronic sensor, into the interior of the housing, at a predetermined, spaced distance from the indicia markings; and e. sensing the indicia markings and producing an optical signal indicative of the absolute position of at least one of the swashplate/yoke and the means for moving the swashplate/yoke.

One version thereof further includes the step of converting the optical signal into an electrical signal indicative of the absolute position. In one variation thereof, the electrical signal includes the step of producing one of an analog voltage, proportional to the angular position of the swashplate/yoke, and a digital serial communication message containing the digital angle of one of the swashplate/yoke. In another variation thereof, the electrical signal includes the step of producing one of an analog voltage, proportional to the longitudinal position of the means for moving the swashplate/yoke, and a digital serial communication containing the longitudinal position of the means for moving the swashplate/yoke, the longitudinal position being indicative of the angular location of the swashplate/yoke.

Another version thereof further includes the step of filling the spaced distance with a working fluid translucent to visible light. In one variation thereof the filling step is accomplished with visible light whose spectrum is solely red. Another variation thereof further includes the step of conducting the light of a strobing LED lamp, via fiber optic bundles, to the absolute scale indicia markings located in a surface of one of the swashplate/yoke and the means for moving the swashplate/yoke. A final variation thereof further includes the step of coinciding the reference location with that of the optical read head.

A further embodiment of the present invention pertains to an optical position sensing device in combination with a variable displacement type hydraulic pump/motor assembly including one of an angularly movable yoke and an angularly movable swashplate, means for moving the swashplate, wherein the improvement comprises the addition of: a. absolute indicia markings, in the form of a bar-type pattern, on a surface of one of the yoke, the swashplate, and the means for moving the swashplate; and b. an optical/electronic sensor unit, capable of reading the indicia markings, fixedly located on a stationary housing of the pump/motor assembly and including an optical read head extending into the interior of the housing and being located at a predetermined, spaced distance from the indicia markings, for sensing the indicia markings, relative to a reference location in the stationary housing, and producing an optical signal indicative of the absolute position of at least one of the yoke, the swashplate, and the means for moving the swashplate.

One version thereof further includes the addition of means for converting the optical signal into an electrical signal indicative of the absolute angular position of at least one of the yoke, the swashplate and the means for moving the swashplate. In a variation thereof the electrical signal includes one of an analog voltage, proportional to one of the angular position of at least one of the yoke and the swashplate and the absolute longitudinal position of the means for moving the swashplate, and a digital serial communication message containing one of the digital angle of at least one of the yoke and the swashplate and the absolute longitudinal position of the means for moving the swashplate, the absolute longitudinal position being indicative of the angular position of the swashplate. In another variation thereof the means for moving the swashplate takes the form of a setting piston, capable of longitudinal movement, pivotally connected with the swashplate.

In a further version thereof, the absolute indicia markings include a progressive, differing, pattern of light and dark strips imparted upon on one of the yoke and the swashplate, the pattern of stripes being in the form of an arched, radially-directed, bar-type pattern having an angular extent substantially corresponding to the angular movements of the swashplate and yoke.

In another version thereof, the means for moving the swashplate takes the form of a setting piston, capable of longitudinal movement and being operatively and pivotally connected with the swashplate, the recurring binary pattern of light and dark stripes being imparted on an outer peripheral surface of the setting piston and being in the form of a laterally-directed, peripherally curved, bar-type pattern having a longitudinal extent substantially corresponding to the maximum longitudinal movement of the setting piston, with longitudinal end locations thereof substantially corresponding with angular end positions of the swashplate.

In a differing version thereof, the signal, indicative of the absolute position of at least one of the yoke, the swashplate and the means for moving the swashplate is utilized for controlling the displacement of the hydraulic pump/motor assembly.

In an additional version thereof, the spaced distance is less than about 1 mm. and is filled with a working fluid translucent to visible light. In a variation thereof, the optical/electrical sensor unit includes a strobing LED lamp whose light is of the red spectrum and is conducted via fiber optic bundles to the absolute location scale indicia markings imparted on an outer surface of one of a ring member attached to the yoke, the swashplate and the means for moving the swashplate.

BRIEF DESCRIPTION OF THE DRAWINGS

FIG. 7 is an enlarged sectional view, taken generally along line 7-7 of FIG. 5

DETAILED DESCRIPTION OF THE INVENTION

Figure 1:
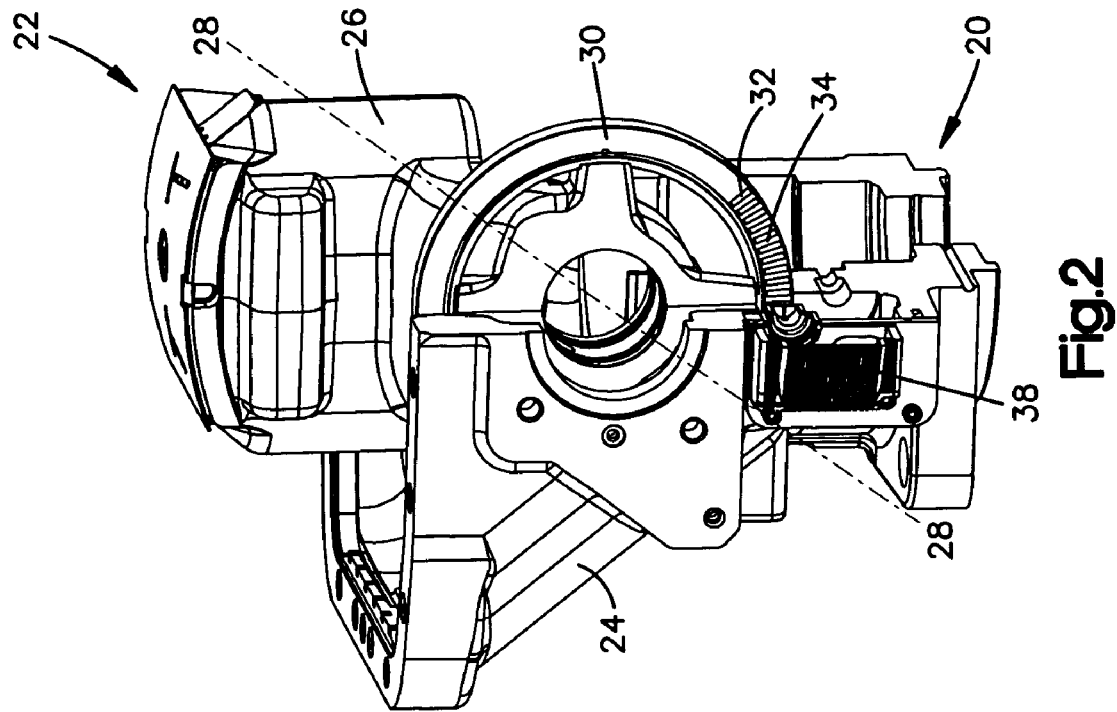
FIG. 1 is a perspective view of a portion of a variable displacement type hydraulic mechanism, such as a pump/motor assembly, partly cut-away, illustrating one embodiment of the optical position sensing device of the present invention, for determining the angular position of one internal component therewithin, herein shown at one extreme angular position thereof.

Referring now to the several drawings, illustrated in FIGS. 1-8, is one embodiment of the optical position sensing device, generally indicated at 20, that finds utility in combination with a variable displacement type hydraulic pump/motor assembly 22, here shown greatly simplified and in perspective as well as being partly cut-away, for both ease of illustration and understanding. Commercial pump/motor assemblies include, but are not limited to, type C-24 bent-axis pump assemblies having yokes, as well as type PV in-line pump assemblies having swashplates, both types being available from the Parker-Hannifin Corporation, of Cleveland, Ohio, U.S.A.

FIGS. 1-4 illustrate a portion of a stationary pump/motor housing 24 that contains a movable yoke 26. The yoke 26 is pivotable around a central axis 28 from the one extreme angular position thereof, shown in FIG. 1, via the intermediate position of FIG. 2, to the other extreme position, shown in FIG. 3. The yoke 26 is provided with a preferably integral ring/disc 30, with an angular portion or arc 34 thereof, corresponding at least to the degree or extent of the angular movement of yoke 26. Portion 34, in turn, is provided with an array of absolute indicia markings 32, in the form of an arc of spaced, radially-directed, individual, unique, bar-type markings representative of the absolute angular position of yoke 26, relative to a reference location on stationary housing 24. As is known in the art, an absolute scale marking allows the detection of an absolute position anywhere within the marked range which, in turn permits the detection of a position, relative to a known reference point or mark. U.S. Pat. No. 5,693,935 to Hassler Jr. et al., which is also assigned to the assignee of the present invention, sets forth a marking technique, applicable to piston rod surfaces that utilize a specific photo-sensing technology. The noted marking technique provides indicia markings in the form of a scale tube in the form of a series of rings and spacers that have differing light reflection characteristics. A rotary version of an optical position transducer DSP (Digital Signal Processor) control electronics and pattern sensor is positioned to read the markings and includes the required probe. U.S. Pat. No. 6,834,574 B2, also assigned to the assignee of the present invention, sets forth a cylinder with an optical position sensing device which, among other things, includes a piston rod indicia marking technique using a laser.

Figure 4:
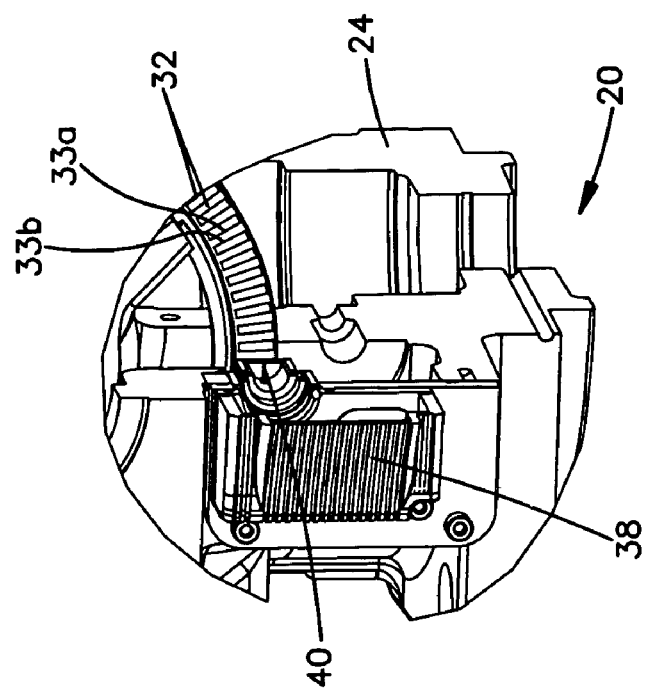
FIG. 4 is an enlargement of the generally circular area A of FIG. 1.
Figure 8:
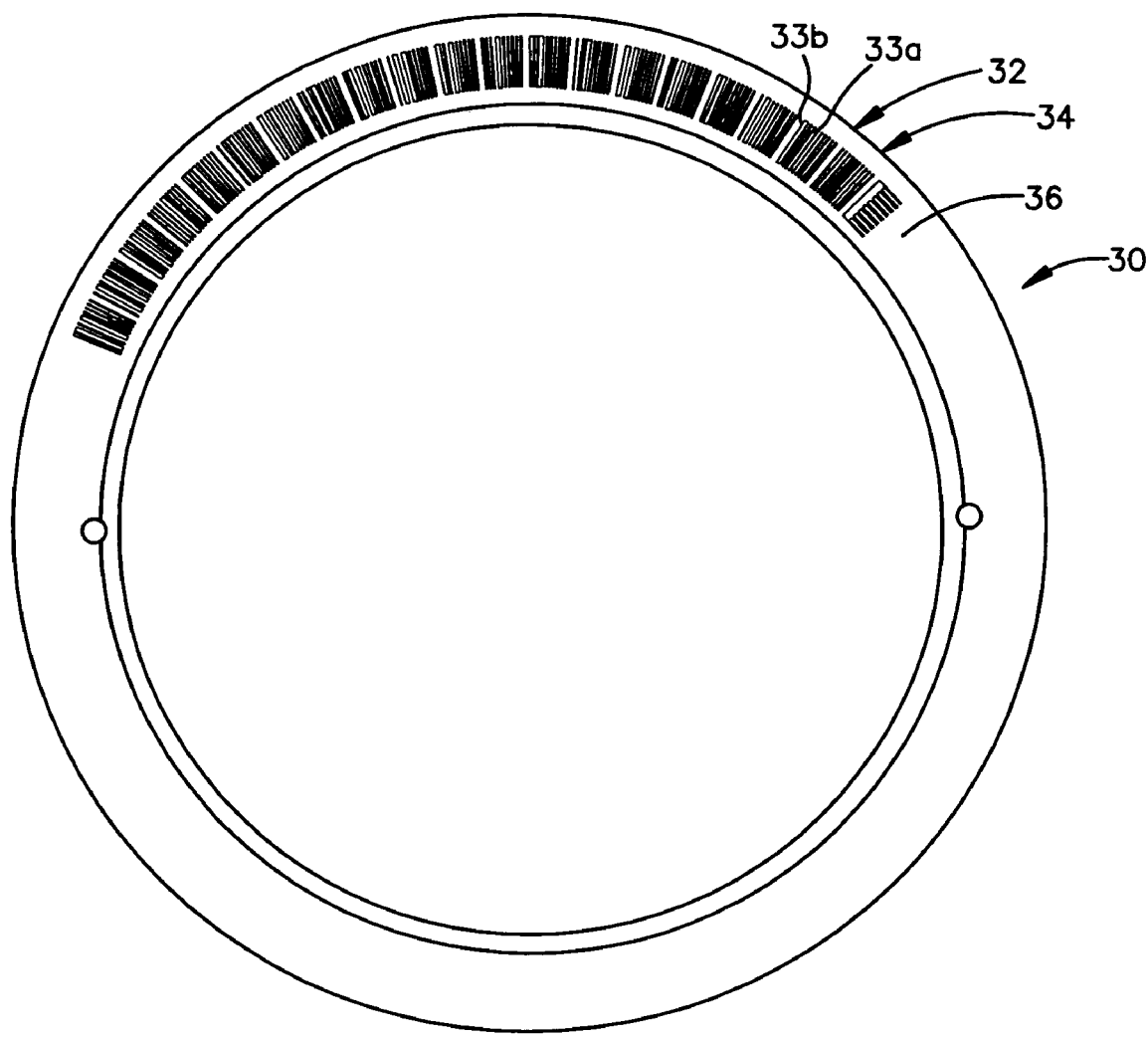
FIG. 8 is a top plan view of a yoke ring on the one internal component, utilized in FIGS. 1-4, illustrating the angularly-spaced, radially-directed, indicia markings thereon that are adapted to be read by an optical/electronic sensor.

In a preferred mode of the present invention, absolute scale indicia markings 32 are provided on the ring/disc member 30 that is, in turn either attached to or forms an integral unit with yoke 26. Indicia markings 32 include a progressive, differing, binary number pattern of dark and light stripes 33a, 33b, respectively, as best seen in FIGS. 4 and 8. This binary number pattern corresponds with specific angular positions of the absolute scale indicia markings imparted on the noted outer surface 36 of, for example, on the anodized outer surface 36 of an aluminum alloy material ring/disc member 30.

Figure 2:
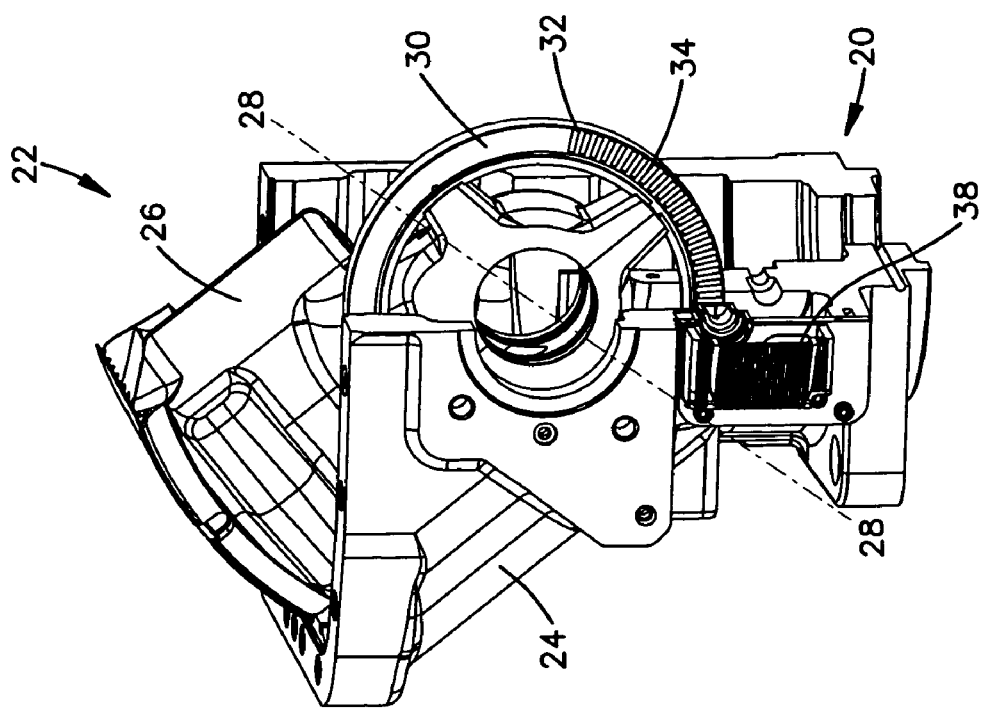
FIG. 2 is a view, similar to that of FIG. 1, showing the one internal component at an intermediate angular position thereof.
Figure 3:
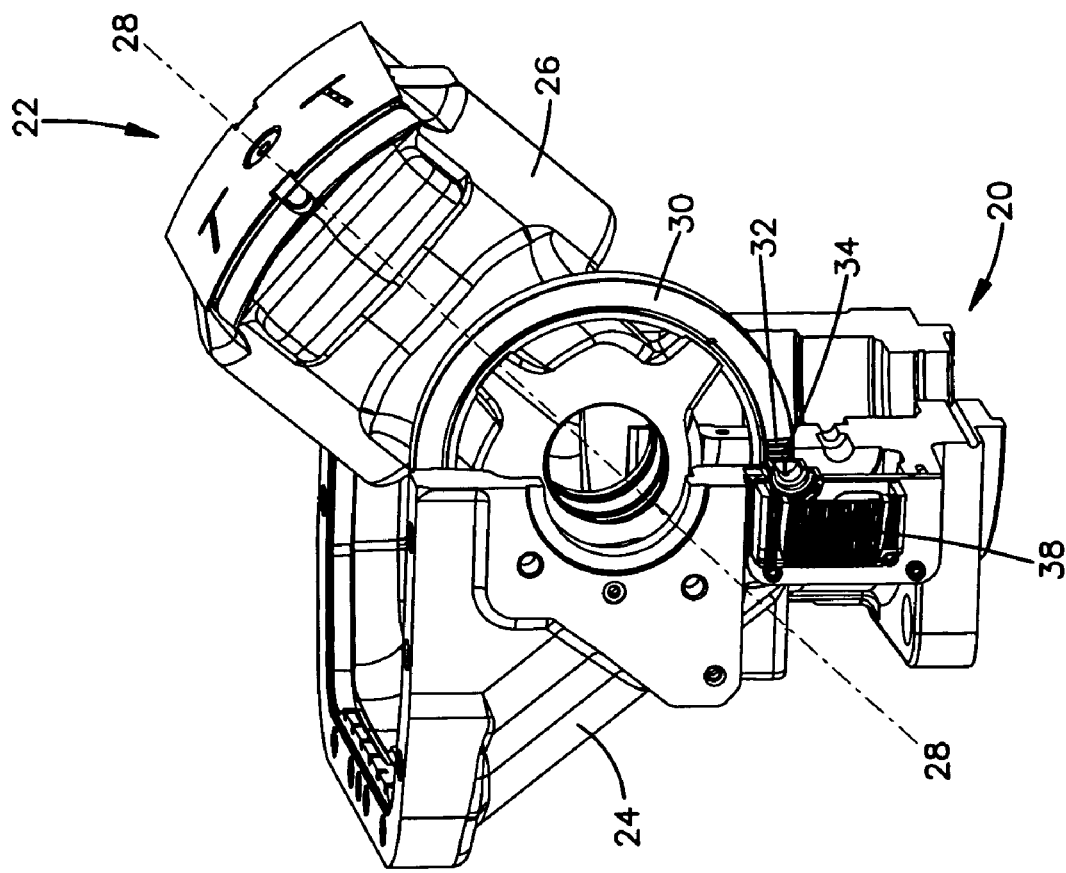
FIG. 3 is a view, again similar to that of FIG. 1, but showing the one internal component at another extreme angular position thereof.
Figure 6:
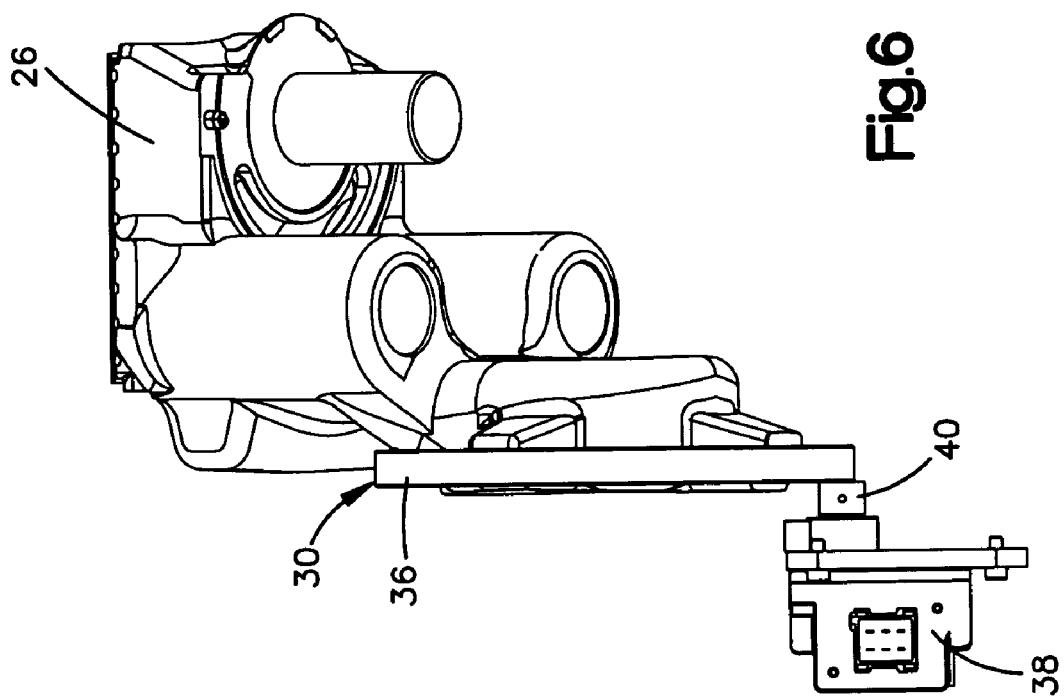
FIG. 6 is a side perspective of the components of FIG. 5.
Figure 5:
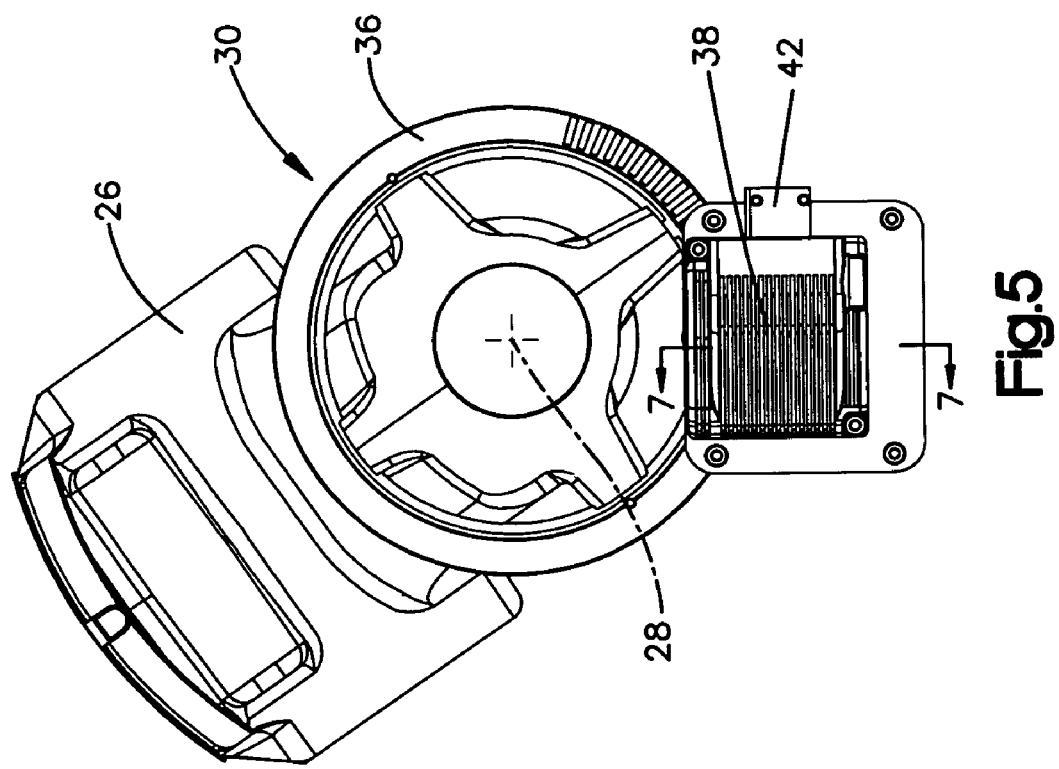
FIG. 5 is frontal perspective view of a yoke, yoke ring and optical/electronic sensor unit, shown in the position of FIG. 1.

As best seen in FIGS. 1-3, an optical/electronic sensor unit 38 is fixedly located on stationary housing 24 and functions for sensing indicia markings 32. As specifically illustrated in FIGS. 4, 6 and 7, sensor unit 38 includes an optical read head 40 that sealingly extends into housing 24 and is positioned so as to sense/read at least axial portions of radially directed indicia markings 32. Read head 40 is located at a predetermined, spaced distance 44 from the outer end surface 36 of ring/disc 30, with the spaced distance 44 being less than 1 mm. in width and preferably about 0.6 mm. in width. In addition, while there may be a total absence of working fluid, i.e., a vacuum, in spaced distance 44, the presence of a working fluid, such as a gas or a liquid, e.g., air or a hydraulic fluid, is preferred. The working fluid, if utilized, needs to be translucent to light, such as visible light, and is preferably confined to the red spectrum. Depending upon the specific application, the types of materials being utilized, and the type of working fluid being used, etc., even IR light may be feasible. FIG. 5 also illustrates a sensor unit connector 42 that serves for connecting sensor unit 38 to any desired type of control system (not shown).

In operation, optical/electronic sensor unit 38 acquires high-speed photographic image data of absolute indicia markings 32, processes the images and extracts an angular position measurement of ring/disc member 30 with respect optical read head 40 of optical/electronic sensor unit or transducer 38. In terms of the output, unit 38 produces either an analog voltage proportional to the angular position of ring/disc 30, or a digital serial communication message containing the digital angle that it transmits over a serial communication bus. It is important to keep in mind that the intended use of unit 38 is to provide positional feedback to a hydraulic controller for closed-loop control of the swashplate, to change the displacement of the pump/motor assembly 24, or for open-loop instrumentation readings. The DSP processes the charge coupled device (CCD) image using a desired algorithm to determine a portion of a pattern embedded in indicia markings 32. The determined portion of the pattern is indicative of the absolute position of read-head 40 relative to the position of yoke ring/disc 30. This is accomplished by periodically strobing a red LED lamp whose light is conducted to ring/disc 30 through emitter fiber-optic bundles and bouncing the light off the deep anodized recurring pattern of dark 33a and light 33b strips, which make up indicia markings 32. The red LED is used if the indicia ring is fabricated of anodized aluminum. It should be understood that other materials may require different frequency light. For example, the piston rod sensor, set forth in U.S. Pat. No. 6,834,574 B2, uses NIR light to see the laser etched markings on a chromed surface. Similar materials may also be used in carrying out the present invention. The resulting image is then transferred back up the fiber optic bundles of read head 40 into the CCD of sensor unit 38. The signal or image from the sensor unit 38 is read into a DSP's memory in the form of an array of 132 10-bit linear pixel elements in one embodiment of the invention. It is important to understand the strobing of the LED since using a continuous light source may result in a "smeared" image as ring/disc 30 attains velocity. It should also be understood that flash intensity, length and focus are characteristics which have to be considered by those skilled in the art in the design of unit 38.

Turning now to FIGS. 9-12 illustrated therein is another embodiment of the optical position sensing device, generally indicated at 120, that finds utility in a variable displacement type hydraulic pump/motor assembly 122, here again shown greatly simplified and in perspective as well as being partly cut-away and fragmentary for ease of illustration and understanding. Parts similar to those of already described with reference to sensing device 20 utilize the same number augmented by prefix "1".

Figure 9:
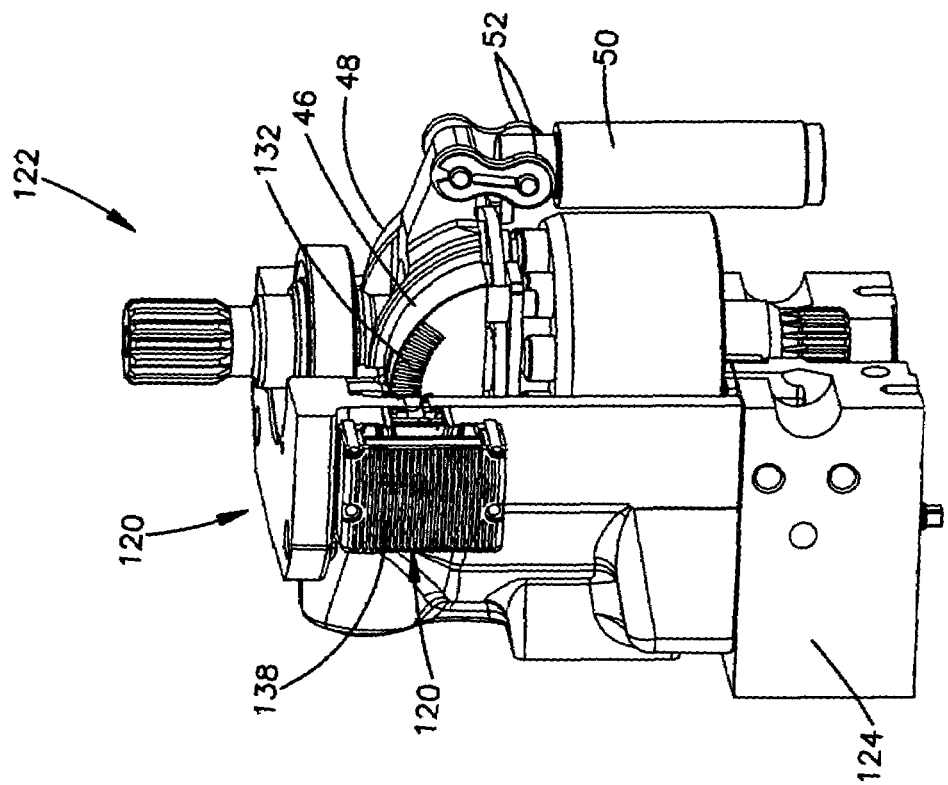
FIG. 9 is another perspective view of a portion of a variable displacement type hydraulic mechanism, such as a pump/motor assembly, partly cut-away, illustrating another embodiment of the optical position sensing device of the present invention, for determining the angular position of another internal component therewithin, herein shown at one extreme angular position thereof.
Figure 10:
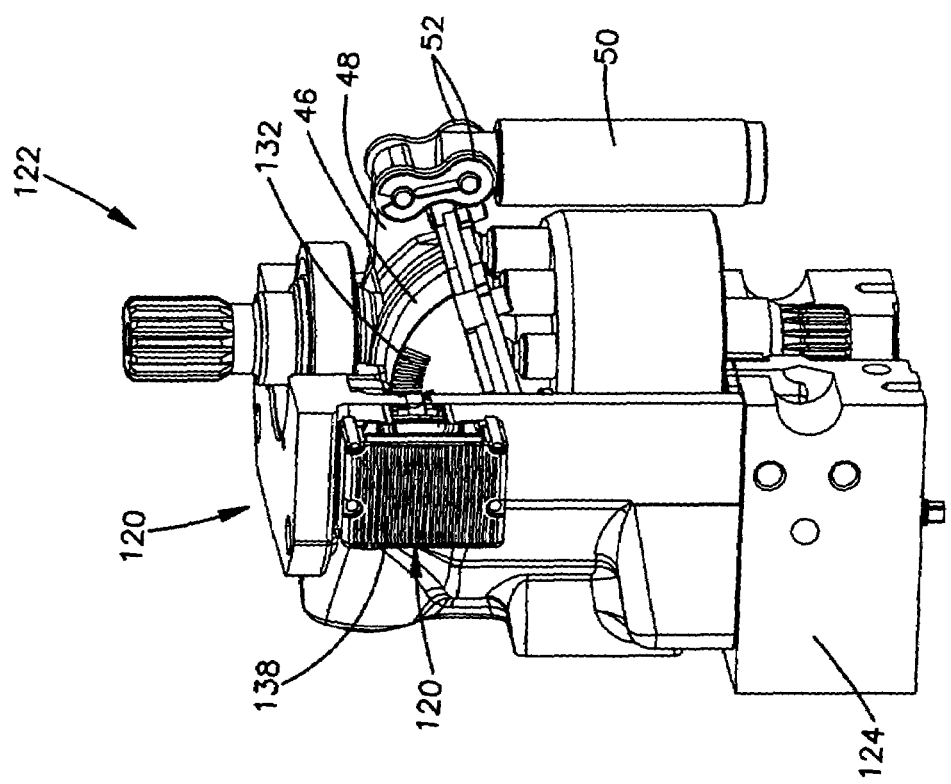
FIG. 10 is a view, similar to that of FIG. 9, showing the another internal component at an intermediate angular position thereof.
Figure 11:
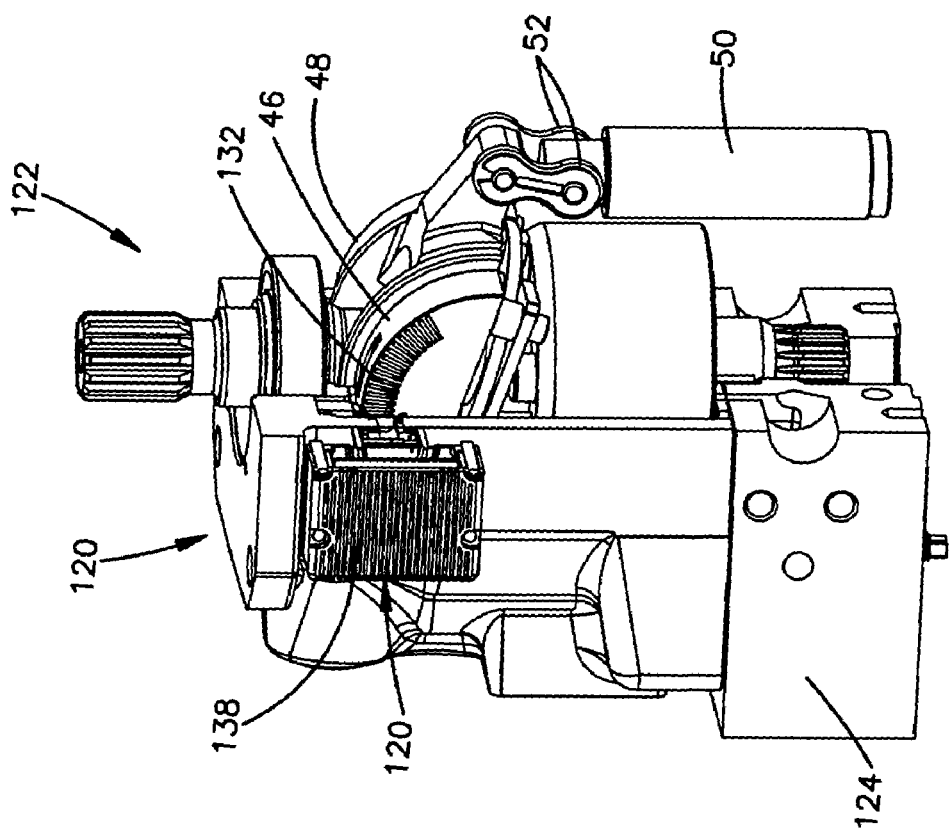
FIG. 11 is a view, again similar to that of FIG. 9, but showing the another internal component at another extreme angular position thereof.
Figure 14:
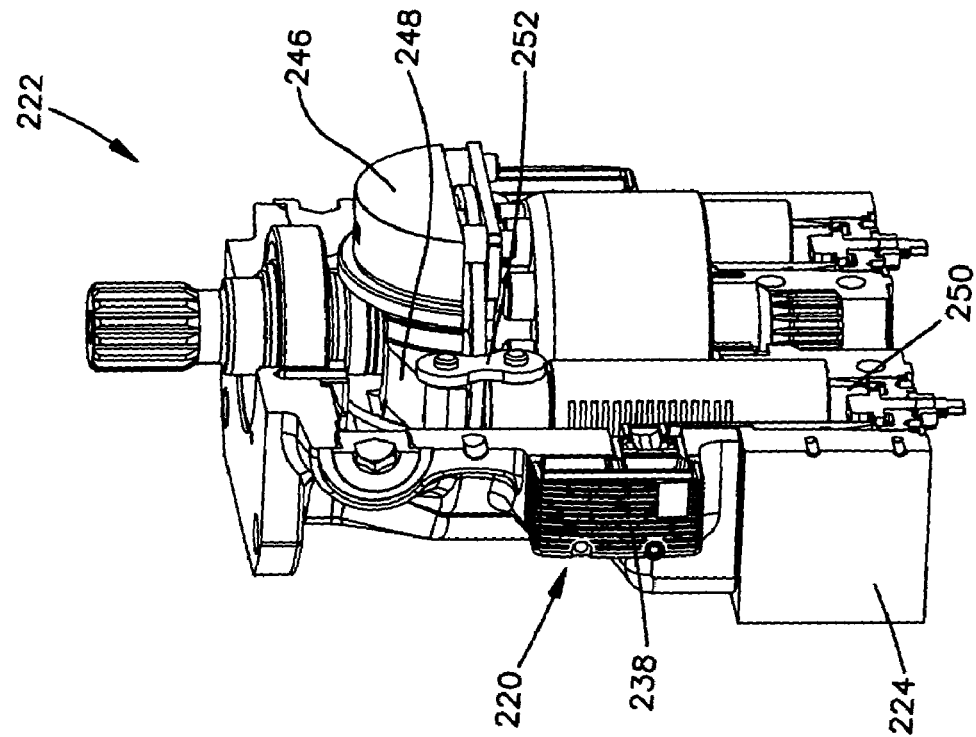
FIG. 14 is a view, similar to that of FIG. 13, showing the further internal component at an intermediate longitudinal position thereof.
Figure 13:
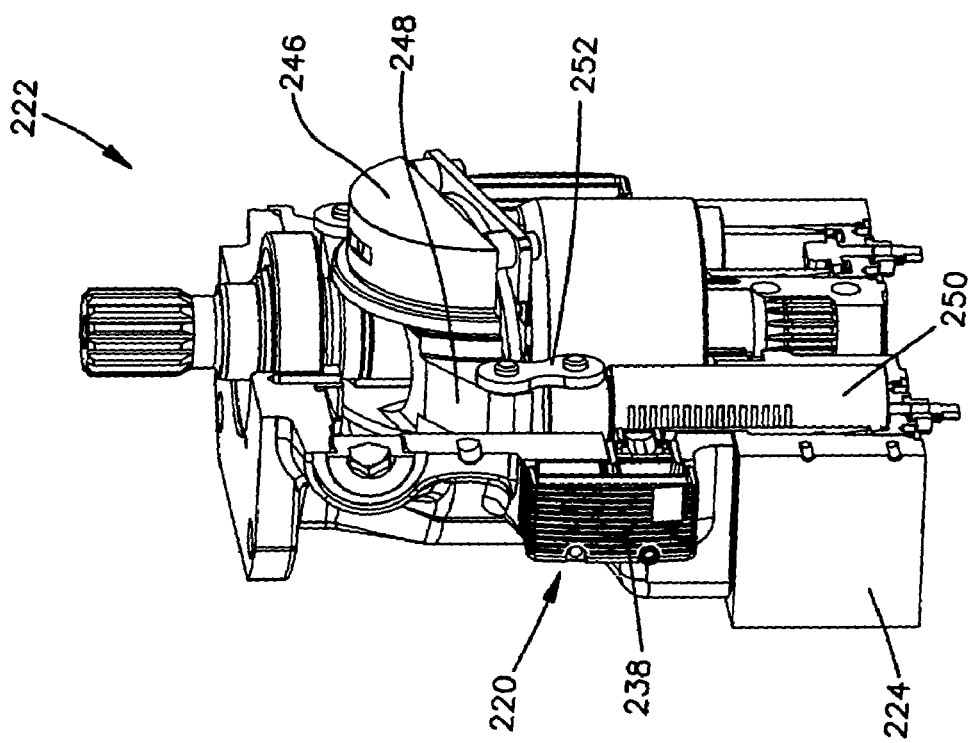
FIG. 13 is a further perspective view of a portion of a variable displacement type hydraulic mechanism, such as a pump/motor assembly, partly cut-away, illustrating a further embodiment of the optical position sensing device of the present invention, for determining the linear position of a further internal component therewithin, herein shown at one extreme longitudinal position thereof.

FIGS. 9-12 illustrate a portion of a stationary pump/motor housing 124 that contains a movable swashplate 46 that is pivotable about a predetermined axis (not shown) from one extreme angular position thereof, shown in FIG. 9, via intermediate positions—one of which is shown in FIG. 10, to the other extreme angular position, shown in FIG. 11, by at least one reciprocating setting piston 50 attached to a swashplate flange portion 48 via parallel, pivotable, coupling members 52. Thus, it should be understood that the reciprocation of setting piston 50 produces the pivoting of swashplate 46 in the manner illustrated in FIGS. 9-11.

Figure 12:
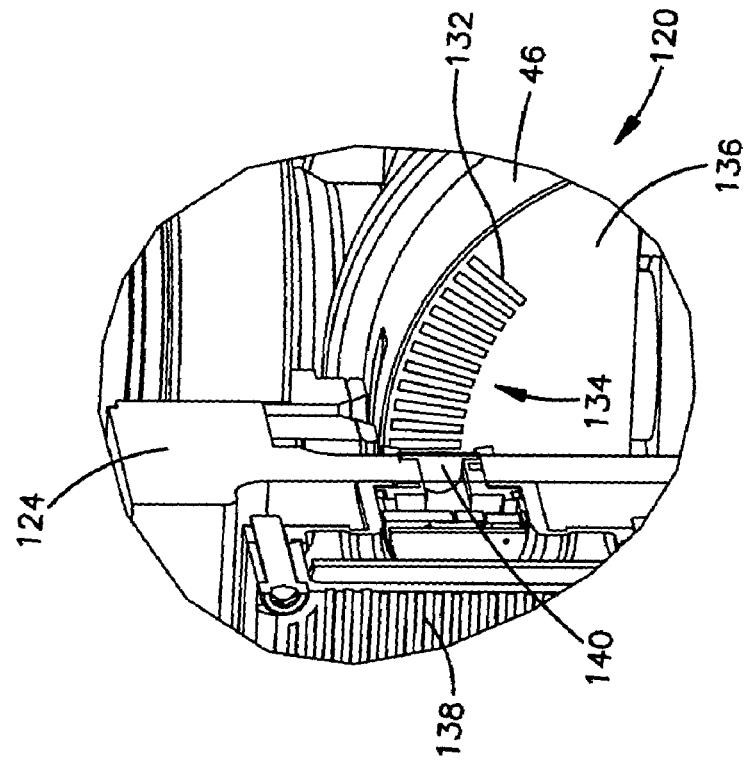
FIG. 12 is an enlargement of the generally circular area B of FIG. 10.

Movable or pivotable swashplate 46 is provided, on an outer wall portion 136 and in an angular or arc portion 134 thereof, with a plurality of preferably integral absolute indicia markings 132, in the form of spaced, radially directed or arched, individual, unique, bar-type markings, substantially similar to already previously described indicia markings 32. Similarly, an optical/electronic sensor unit or transducer 138, again substantially similar to previously described such unit 38, is fixedly located on stationary housing 124 and functions, at that location, for sensing indicia markings 132. As best seen in FIG. 12, sensor unit 138 also includes an optical read head 140, similar to read head 40 that again sealingly extends into housing 124 and is positioned to sense/read at least axial portions of indicia markings 132. Read head 140 is also located at a predetermined, spaced distance, not shown here but similar to previously-described spaced distance 44, from the outer surface 136 of swashplate 46 and thus, optical position sensing device 120 is substantially similar in operation to previously-described optical position sensing device 20 and need not be described further.

Continuing now with FIGS. 13-16, illustrated therein is a further embodiment of the optical position sensing device of the present invention, generally indicated at 220, that finds utility in a variable displacement type hydraulic pump/motor assembly 222, here again shown greatly simplified and in perspective as well as being partly cut-away and fragmentary for ease of illustration and understanding. Parts similar to those already described with reference to sensing devices 20 and 120 utilize the same number augmented by prefix "2".

FIGS. 13-16 again illustrate a portion of a stationary pump/motor housing 224 that contains a movable swashplate 246 that is pivotable about a predetermined axis (not shown) from one extreme angular position thereof, shown in FIG. 13, via intermediate positions, one of which is shown in FIG. 14, to the other extreme angular position, shown in FIG. 15, by at least one reciprocating setting piston 250 attached to a swashplate flange portion 248 via parallel coupling members 252. Thus, it will be understood that the reciprocation of setting piston 250 produces the pivoting of swashplate 246 in the manner illustrated in FIGS. 13-16.

Figure 16:
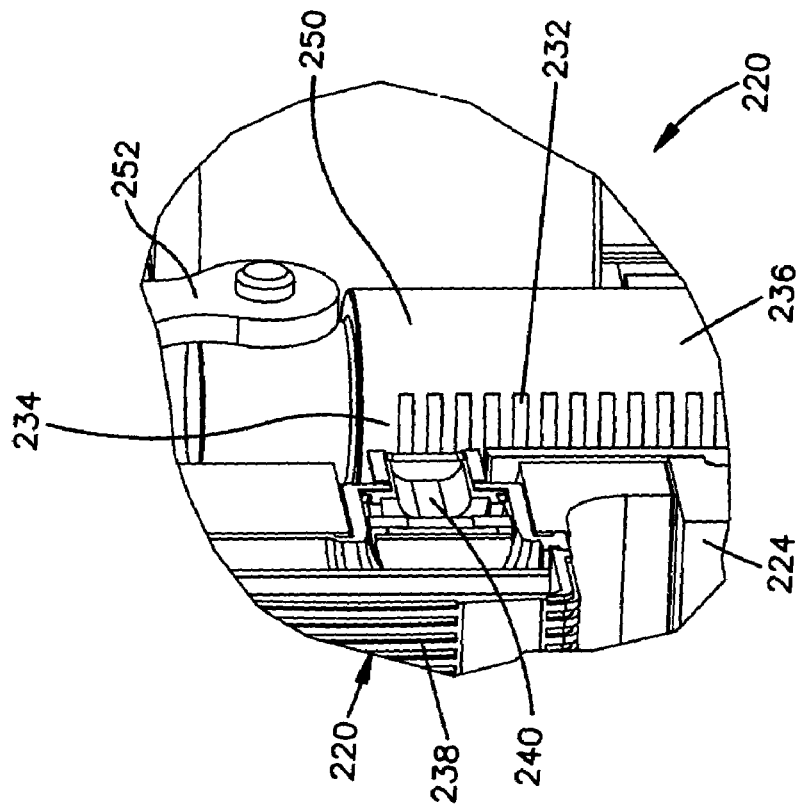
FIG. 16 is an enlargement of the generally circular area C of FIG. 13.
Figure 15:
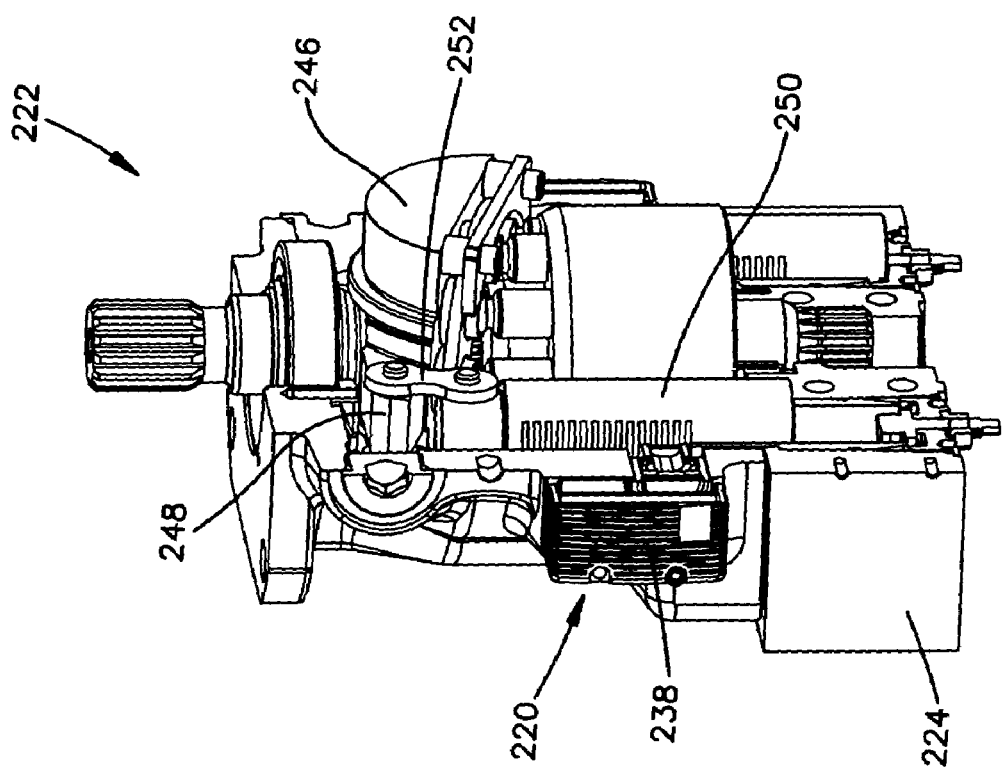
FIG. 15 is a view, again similar to that of FIG. 13, but showing the further internal component at another extreme longitudinal position thereof.

Reciprocating setting piston 250 is provided, on an outer wall surface portion 236 and in an angular or arc portion 234 thereof, with a plurality of preferably integral absolute indicia markings 232, in the form of spaced, laterally directed or arched, individual, unique, bar-type, indicia markings, very similar to already previously described indicia markings 32. Similarly, an optical/electronic sensor unit or transducer 238, again substantially similar to previously described such unit 38, is fixedly located on stationary housing 224 and functions, at that location, for sensing indicia markings 232. As best seen in FIG. 16, sensor unit 238 also includes an optical read head 240, similar to read head 40 that again sealingly extends into housing 224 and is positioned to sense/read at least axial portions of indicia markings 232. Read head 240 is again located at a predetermined, spaced distance, not shown here but similar to spaced distance 44 in sensing unit 20, from the outer surface 236 of setting piston 250. Thus, optical position sensing device 220 is very similar in operation and function to previously-described optical position sensing devices 20 and 120. The main difference between device 120 and device 220 is that while the former directly senses/reads the rotary or pivotal movement of swashplate 146, device 220 senses/reads the linear displacement of reciprocating setting piston 250 which, however, is translated into the rotary or pivoting movement of swashplate 246 via coupling members 252. In other words, device 220 provides an indirect sensing/reading of the rotary/pivoting movement of swashplate 246.

Based on the previous discussion, it should be understood that the present invention pertains to several embodiments of optical position sensing units, such as 20, 120 and 220, that function to determine the position of movable components with a hydraulic pump/motor assembly. Specifically, an optical sensor head is incorporated within the pump/motor assemblies to determine, either directly or indirectly, the exact position of one of the yokes or swashplates, etc. therewithin. As noted, specific indicia markings 32, 132 and 232 are provided so that the optical sensor head can read/sense the noted indicia markings and send electrical signals to the pump/motor controls which, in turn, can monitor or move the internal componentry, such as yokes and/or swashplates, etc., to change the displacement of the pump/motor.

The present invention provides much more accurate sensing than has been possible in the prior art in that the latter typically read the rotation of the pivot point of the yoke/swashplate. The present invention provides for optical reading, either directly or indirectly, of the radial extent of the movement of the yoke/swashplate, i.e., the yoke/swashplate is not marked at its pivot point, but rather is marked at distances either radially or axially away from the noted pivot point, thus improving accuracy.

Typically, it is difficult to design a pump/motor assembly that can position the sensor so that it can read the angular displacement of the yoke/swashplate but the present invention overcomes this obstacle by designing the pump/motor housing so that it can readily incorporate the sensor in a position close to the component to be sensed. The noted housing is also designed for ease of maintenance in that sensor access is easy so that the sensor, or even the entire optical position sensing unit, can readily be replaced without undue inconvenience and does not require disassembly of the pump/motor. In addition, the replacement sensor or sensing unit does not need to be recalibrated since the marked components, e.g., the yoke ring, swashplate or swashplate setting piston, is the calibrated component.

The present invention also presents a simplified design in that it utilizes but a minimum number of moving parts, with the sensing unit being incorporated within an existing part (housing) of the pump/motor assembly. Furthermore, the sensed portions, i.e., the indicia markings, are provided on existing parts of the pump/motor assembly, e.g., the yoke, swashplate or the swashplate setting piston. In addition, the spaced distance or gap between the sensor and the sensed component is not as critical as with other prior art sensors and the lack of physical contact therebetween essentially obviates frictional wear.

Finally, it should be clear that although the previous description has referenced examples of specific sensed components, such as a yoke, swashplate or setting piston for the swashplate, other movable components within the confines of the pump/motor housing can also be sensed since the sensor or sensing unit can be positioned virtually anywhere on or within the pump/motor assembly.

Thus, it is deemed that one of ordinary skill in the art will readily recognize that the several embodiments of the present invention fill remaining needs in this art and will be able to affect various changes, substitutions of equivalents and various other aspects of the invention as described herein. It is therefore intended that the protection granted hereon be limited only by the scope of the appended claims and their equivalents.

What is claimed is:

1. An improved optical position sensing device for a variable displacement type hydraulic pump/motor assembly including one of an angularly movable yoke and an angularly movable swashplate, an optical/electronic sensor unit capable of reading indicia markings, for sensing the movement of at least one of said yoke, said swashplate and means for moving said swashplate, relative to a reference location in a stationary housing of said pump/motor assembly, said one of said yoke, said swashplate and said means for moving said swashplate, being provided with a plurality of absolute scale indicia markings, wherein said improvement comprises:

a. said absolute scale indicia markings being in the form of a bar-type pattern and being located on a surface of one of said angularly movable yoke, said swashplate and said means for moving said swashplate; and b. said optical/electronic sensor unit being fixedly located on said stationary housing and including an optical read head sealingly extending into the interior of said housing and being located at a predetermined, spaced distance from said indicia markings for sensing said indicia markings and producing an optical signal.

2. The improvement of claim 1, further including means for converting said optical signal into an electrical signal indicative of the absolute position of said at least one of said yoke, said swashplate and said means for moving said swashplate.

3. The improvement of claim 2, wherein said electrical signal includes one of an analog voltage, proportional to the angular position of said at least one of said yoke and said swashplate, and a digital serial communication message containing the digital angle of at least one of said yoke and said swashplate.

4. The improvement of claim 2, wherein said electrical signal includes one of an analog voltage, proportional to the absolute longitudinal position of said means for moving said swashplate, and a digital serial communication containing the absolute longitudinal position of said means for moving said swashplate, said absolute longitudinal positions being indicative of the angular location of said swashplate.

5. The improvement of claim 1, wherein said means for moving said swashplate takes the form of a setting piston capable of longitudinal movement, said setting piston being operatively pivotally interconnected with said swashplate.

6. The improvement of claim 1, wherein said distance is less than 1 mm. in width.

7. The improvement of claim 1, wherein said distance is filled with a working fluid.

8. The improvement of claim 7, wherein said working fluid is translucent to light.

9. The improvement of claim 8, wherein said light is visible light.

10. The improvement of claim 9, wherein said visible light is strobed and confined to the red spectrum.

11. The improvement of claim 8, wherein said light is infrared light.

12. The improvement of claim 8, wherein said working fluid is at least one of a liquid and a gas.

13. The improvement of claim 12, wherein said liquid includes hydraulic fluid and said gas includes air.

14. The improvement of claim 1, wherein there is an absence of a working fluid in said spaced distance.

15. The improvement of claim 1, wherein said absolute scale indicia markings are provided on one of a ring member and disc attached to said yoke.

16. The improvement of claim 15, wherein said indicia markings are integral with said one of said ring member and disc.

17. The improvement of claim 1, wherein said absolute scale indicia markings are provided on said swashplate.

18. The improvement of claim 17, wherein said indicia markings are integral with said swashplate.

19. The improvement of claim 1, wherein said indicia markings include a progressive, differing, binary number pattern of dark and light stripes, said binary number pattern corresponding with specific angular positions of said absolute indicia markings on said surface.

20. The improvement of claim 1, wherein said indicia markings include a random pattern of dark and light stripes.

21. The improvement of claim 19, wherein said progressive, differing, binary pattern of dark and light stripes is anodized on one of a ring member and disc attached to one of said swashplate and yoke, with said pattern of stripes being in the form of an arched, radially-directed, bar-type pattern having an angular extent corresponding to at least the angular movement of said swashplate and yoke.

22. The improvement of claim 19, wherein said progressive, differing, binary pattern of dark and light stripes is integral with said swashplate, said pattern of stripes being in the form of an arched, radially-directed, bar-type pattern having an angular extent substantially corresponding to the angular movement of said swashplate.

23. The improvement of claim 17, wherein said progressive, differing, binary pattern of dark and light stripes in integral with said means for moving said swashplate.

24. The improvement of claim 23, wherein said means for moving said swashplate takes the form of a setting piston capable of longitudinal movement and operatively pivotally interconnected with said swashplate, said progressive, differing, binary pattern of stripes being integral with an outer peripheral surface of said setting piston and being in the form of a laterally-directed, peripherally curved, bar-type pattern having a longitudinal extent substantially corresponding to the maximum longitudinal movement of said setting piston, with longitudinal locations thereof substantially corresponding with angular positions of said swashplate.

25. The improvement of claim 1, wherein said reference location substantially coincides with the location of said optical read head.

26. The improvement of claim 2, wherein said electrical signal is utilized for providing positional feed back to a hydraulic controller for closed-loop control of one of said yoke, said swashplate and said means for moving said swashplate.

27. The improvement of claim 2, wherein said electrical signal is utilized for providing positional feedback for open-loop instrumental purposes.

28. The improvement of claim 1, wherein said optical/electronic sensor unit includes a strobing LED lamp and the light thereof is conducted to said absolute scale indicia markings located in a surface of one of a ring member/disc attached to said yoke, said swashplate and said means for moving said swashplate.

29. The improvement of claim 28, wherein the spectrum of said light is red.

30. A method for sensing the absolute position of an angularly movable swashplate/yoke in a variable displacement type hydraulic pump/motor assembly, said assembly including: said angularly movable swashplate/yoke; means for moving said swashplate/yoke; an optical electronic sensor unit capable of reading indicia markings for sensing the movement of at least one of said swashplate/yoke and said means for moving said swashplate/yoke relative to a reference location in a stationary housing containing said pump/motor assembly, said method including the steps of:
a. providing one of said swashplate/yoke and said means for moving said swashplate/yoke with absolute indicia markings;
b. forming said indicia markings in a bar-type pattern and locating same in a surface of one of said swashplate/yoke and said means for moving said swashplate/yoke;
c. fixedly locating said optical/electronic sensor on said stationary housing;
d. extending an optical read head, associated with said optical/electronic sensor, into the interior of said housing at a predetermined, spaced distance from said indicia markings; and
e. sensing said indicia markings and producing an optical signal indicative of the absolute position of said at least one of said swashplate/yoke and said means for moving said swashplate/yoke.

31. The method of claim 30, further including the step of converting said optical signal into an electrical signal indicative of said absolute position.

32. The method of claim 31, wherein said electrical signal includes the step of producing one of an analog voltage, proportional to the angular position of said swashplate/yoke, and a digital serial communication message containing the digital angle of said swashplate/yoke.

33. The method of claim 31, wherein said electrical signal includes the step of producing one of an analog voltage, proportional to the longitudinal position of said means for moving said swashplate/yoke, and a digital serial communication containing the longitudinal position of said means for moving said swashplate/yoke, said longitudinal position being indicative of the angular location of said swashplate/yoke.

34. The method of claim 30, further including the step of filling said distance with a working fluid translucent to visible light.

35. The method of claim 34, wherein said filling step is accomplished with visible light whose spectrum is solely red.

36. The method of claim 34, further including the step of conducting the light of a strobing LED lamp, via fiber optic bundles, to said absolute scale indicia markings located in a surface of one of said swashplate/yoke and said means for moving said swashplate/yoke.

37. The method of claim 34, further including the step of coinciding said reference location with that of said optical read head.

38. An optical position sensing device in combination with a variable displacement type hydraulic pump/motor assembly including one of an angularly movable yoke and an angularly movable swashplate, and means for moving said swashplate, wherein the improvement comprises the addition of:
    a. absolute indicia markings, in the form of a bar-type pattern, on a surface of one of said yoke, said swashplate, and said means for moving said swashplate; and;
    b. an optical/electronic sensor unit capable of reading said indicia markings fixedly located on a stationary housing of said pump/motor assembly and including an optical read head extending into the interior of said housing and being located at a predetermined, spaced distance from said indicia markings for sensing said indicia markings relative to a reference location in said stationary housing and producing an optical signal indicative of the absolute position of at least one of said yoke, said swashplate, and said means for moving said swashplate.

39. The improvement of claim 38, further including the addition of means for converting said optical signal into an electrical signal indicative of the absolute angular position of at least one of said yoke, said swashplate and said means for moving said swashplate.

40. The improvement of claim 39, wherein said electrical signal includes one of an analog voltage, proportional to one of the angular position of at least one of said yoke and said swashplate and the absolute longitudinal position of said means for moving said swashplate, and a digital serial communication message containing one of the digital angle of at least one of said yoke and said swashplate and the absolute longitudinal position of said means for moving said swashplate, said absolute longitudinal position being indicative of the angular position of said swashplate.

41. The improvement of claim 40, wherein said means for moving said swashplate takes the form of a setting piston, capable of longitudinal movement, pivotally connected with said swashplate.

42. The improvement of claim 38, wherein said absolute indicia markings include a progressive, differing, pattern of light and dark strips imparted upon on one of said yoke and said swashplate, said pattern of stripes being in the form of an arched, radially-directed, bar-type pattern having an angular extent substantially corresponding to the angular movements of said swashplate and yoke.

43. The improvement of claim 38, wherein said means for moving said swashplate takes the form of a setting piston, capable of longitudinal movement and being operatively and pivotally connected with said swashplate, a recurring binary pattern of light and dark stripes being imparted on an outer peripheral surface of said setting piston and being in the form of a laterally-directed, peripherally curved, bar-type pattern having a longitudinal extent substantially corresponding to the maximum longitudinal movement of said setting piston, with longitudinal end locations thereof substantially corresponding with angular end positions of said swashplate.

44. The improvement of claim 38, wherein said signal, indicative of the absolute position of at least one of said yoke, said swashplate and said means for moving said swashplate, is utilized for controlling the displacement of said hydraulic pump/motor assembly.

45. The improvement of claim 38, wherein said distance is less than about 1 mm. and is filled with a working fluid translucent to visible light.

46. The improvement of claim 45, wherein said optical/electrical sensor unit includes a strobing LED lamp whose light is of the red spectrum and is conducted via fiber optic bundles to said absolute location scale indicia markings imparted on an outer surface of one of a ring member attached to said yoke, said swashplate and said means for moving said swashplate.

* * * * *